United States Patent
Miyazaki (10) Patent No.: US 11,002,211 B2
(45) Date of Patent: May 11, 2021

(54) ENGINE DIAGNOSTIC SYSTEM AND ENGINE DIAGNOSING METHOD

(71) Applicant: TOYOTA JIDOSHA KABUSHIKI KAISHA, Toyota (JP)

(72) Inventor: Tsutomu Miyazaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/848,311

(22) Filed: Apr. 14, 2020

(65) Prior Publication Data
US 2020/0362785 A1 Nov. 19, 2020

(30) Foreign Application Priority Data
May 17, 2019 (JP) .............................. JP2019-093653

(51) Int. Cl.
| | |
|---|---|
| *F02D 41/22* | (2006.01) |
| *F02D 41/14* | (2006.01) |
| *F02P 5/152* | (2006.01) |
| *F02D 41/26* | (2006.01) |
| *F02D 41/24* | (2006.01) |

(52) U.S. Cl.
CPC ......... *F02D 41/1498* (2013.01); *F02D 41/22* (2013.01); *F02D 41/2451* (2013.01); *F02D 41/26* (2013.01); *F02P 5/152* (2013.01)

(58) Field of Classification Search
CPC ...... F02D 41/1498; F02D 41/22; F02D 41/26; F02D 41/2451; F02P 5/152
USPC ............... 701/107, 111; 123/406.13, 406.37, 123/406.38, 406.39, 466; 73/35.07
See application file for complete search history.

(56) References Cited

FOREIGN PATENT DOCUMENTS

JP 2004-028061 A 1/2004

*Primary Examiner* — Hai H Huynh
(74) *Attorney, Agent, or Firm* — Oliff PLC (57) ABSTRACT

An engine diagnostic system is provided for diagnosing a deterioration degree of an engine mounted on a vehicle. The engine diagnostic system learns, as a knock learning value, a maximum advancement amount of an ignition timing that reduces knocking. A database stores time-series data of the knock learning value of the engine for each individual engine. The knock learning value is acquired from each of a plurality of vehicles of the same model. An evaluation process computes an evaluation value indicating the deterioration degree of a designated engine using the time-series data of the knock learning value of each engine stored in the database.

8 Claims, 4 Drawing Sheets

ENGINE DIAGNOSTIC SYSTEM AND ENGINE DIAGNOSING METHOD

BACKGROUND

1. Field

The present disclosure relates to an engine diagnostic system that diagnoses the deterioration degree of an engine mounted on a vehicle and to an engine diagnosing method that diagnoses the deterioration degree.

2. Description of Related Art

Knock control is known as a technique for controlling spark-ignition engines. In knock control, feedback control is performed on the basis of the output of a knock sensor to advance the ignition timing in the range that reduces the occurrence of knocking. As disclosed in Japanese Laid-Open Patent Publication No. 2004-28061, the maximum advancement amount of the ignition timing that reduces knocking is learned as a knock learning value in the knock control.

The knock resistance of such an engine decreases in accordance with the deterioration of the engine over time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: An engine diagnostic system that diagnoses a deterioration degree of an engine is provided. The engine is mounted on a vehicle. The engine diagnostic system is configured to learn, as a knock learning value, a maximum advancement amount of an ignition timing that reduces knocking of the engine. The engine diagnostic system includes a database, which is configured to store time-series data of the knock learning value of the engine for each individual engine. The knock learning value is acquired from each of a plurality of vehicles of the same model. The engine diagnostic system is configured to execute an evaluation process, which computes an evaluation value indicating the deterioration degree of a designated engine using the time-series data of the knock learning value of each engine stored in the database.

The database of the engine diagnostic system collects the time-series data of the knock learning value from multiple engines mounted on the vehicles of the same model. The time-series data of the knock learning value of the engine to be diagnosed is compared with those of other engines. This enables the evaluation of the deterioration degree of the engine relative to other engines. Thus, in the evaluation process of the above-described engine diagnostic system, the following evaluation value is obtained without setting the criterion used in evaluating the deterioration degree. That is, the evaluation value indicating the deterioration degree of the engine to be diagnosed is computed as a value showing the evaluation relative to the engines, the time-series data of the knock learning value of each of which is stored in the database. Also, the change in the knock learning value over time from the initial value can be tracked in the time-series data. Thus, even if there are individual differences in the initial value of the knock learning value among the engines, the deterioration degree of the engine is properly diagnosed using the knock learning value. Thus, the above-described engine diagnostic system is capable of properly diagnosing the deterioration degree of the engine using the knock learning value.

As the engine deteriorates over time, the knock resistance of the engine is decreased. As such, the knock learning value may be used as an index of the deterioration degree of the engine. However, even among new engines that have not at all deteriorated, there are individual differences in the advancement limit of the ignition timing that reduces the occurrence of knocking. The individual differences in the advancement limit among the engines are inherited to the values of the knock learning value when the deterioration of the engines progresses. Thus, even if the deterioration degree is substantially equal, the knock learning value may differ depending on the individual engines. That is, the deterioration degree of the engine may possibly be fail to be evaluated properly when only the knock learning value is used. Additionally, to evaluate the deterioration degree of the engine from the knock learning value, the correlation between the knock learning value and the deterioration degree needs to be checked previously. However, the deterioration of the engine gradually progresses over a long period of time. Thus, it is difficult to check the correlation through, for example, tests.

In some cases, the knock resistance of the engine changes greatly depending on the type of fuel used. In such a case, if the data of the knock learning value learned when different types of fuel are used is mixed in the time-series data collected in the database, the deterioration degree of the engine may possibly fail to be diagnosed properly. Such mixing of the knock learning value learned when different types of fuel is used in the time-series data is avoided by the following configuration of the above-described engine diagnostic system. That is, in Example 2, the engine diagnostic system of Example 1 may be configured such that: the engine diagnostic system is configured to acquire, from the vehicle, fuel-type information of fuel used in the engine when the knock learning value is learned together with the knock learning value; and the engine diagnostic system is configured to store, in the database, only the time-series data of the knock learning value learned when a specific type of fuel is being used. With this configuration, the knock learning value learned when different types of fuel are used is prevented from being mixed in the time-series data. Also, in Example 3, the engine diagnostic system of Example 1 may be configured such that: the engine diagnostic system is configured to execute a fuel determination process, which determines a type of fuel used in the engine when the knock learning value is learned; and the engine diagnostic system is configured to store, in the database, only the time-series data of the knock learning value learned when a specific type of fuel is being used. This also prevents the knock learning value learned when different types of fuel are used from being mixed in the time-series data. Further, in Example 4, the engine diagnostic system of Example 1 may be configured such that: the engine diagnostic system is configured to execute a fuel determination process, which determines a type of fuel used in the engine when the knock learning value is learned; and the engine diagnostic system is configured to store the time-series data of the knock learning value in the database and to compute the evaluation value in the evaluation process separately for each type of fuel. With this configuration also, the knock learning value learned when different types of fuel are used is prevented from being mixed in the time-series data.

When a type of fuel different from the fuel that has been used is supplied, the knock learning value changes by a large amount before and after the fuel is supplied. Therefore, in Example 5, the engine diagnostic system of Example 3 or 4 may be configured such that the fuel determination process is executed by determining the type of fuel used based on the difference between a previously acquired value and a currently acquired value of the knock learning value of the engine to be determined.

In general, the total traveled distance of the vehicle is often used as the index value for the period of use of the vehicle or of the engine mounted on the vehicle. Therefore, in Example 6, the engine diagnostic system of any one of Examples 1 to 5 is preferably configured such that the database stores the time-series data of the knock learning value with a total traveled distance of the vehicle used as a time-series axis.

Example 7: An engine diagnosing method for diagnosing a deterioration degree of an engine mounted on a vehicle is provided. The engine diagnosing method includes: learning, as a knock learning value, a maximum advancement amount of an ignition timing that reduces knocking of the engine; acquiring and collecting time-series data of the knock learning value of the engine from a plurality of vehicles of the same model; and computing and outputting an evaluation value indicating the deterioration degree of the engine to be diagnosed using the collected time-series data in response to an input of individual identification information of the engine to be diagnosed. The engine diagnosing method diagnoses the deterioration degree of the engine through the acquiring and collecting of the time-series data and the computing and outputting of the evaluation value.

At the first step, the time-series data of the knock learning value is collected from multiple engines mounted on the vehicles of the same model. By comparing the time-series data of the knock learning value of the engine to be diagnosed with those of other engines, the deterioration degree of the engine relative to the other engines can be evaluated. Thus, in the above-described engine diagnosing method, without setting the criterion used in evaluating the deterioration degree, the evaluation value indicating the deterioration degree of the engine to be diagnosed can be computed as the value showing the evaluation relative to the engines from each of which the time-series data of the knock learning value is collected. Furthermore, the changes in the knock learning value over time from the initial value are tracked in the time-series data. Thus, even if there are individual differences in the initial value of the knock learning value among the engines, the deterioration degree of the engine can be properly diagnosed using the knock learning value. Consequently, the above-described engine diagnosing method properly diagnoses the deterioration degree of the engine using the knock learning value.

Example 8: A non-transitory computer readable memory medium is provided that stores a program of an engine diagnosing process that causes a computer to perform the various processes of the engine diagnosing method described in Example 7.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Figure 1:
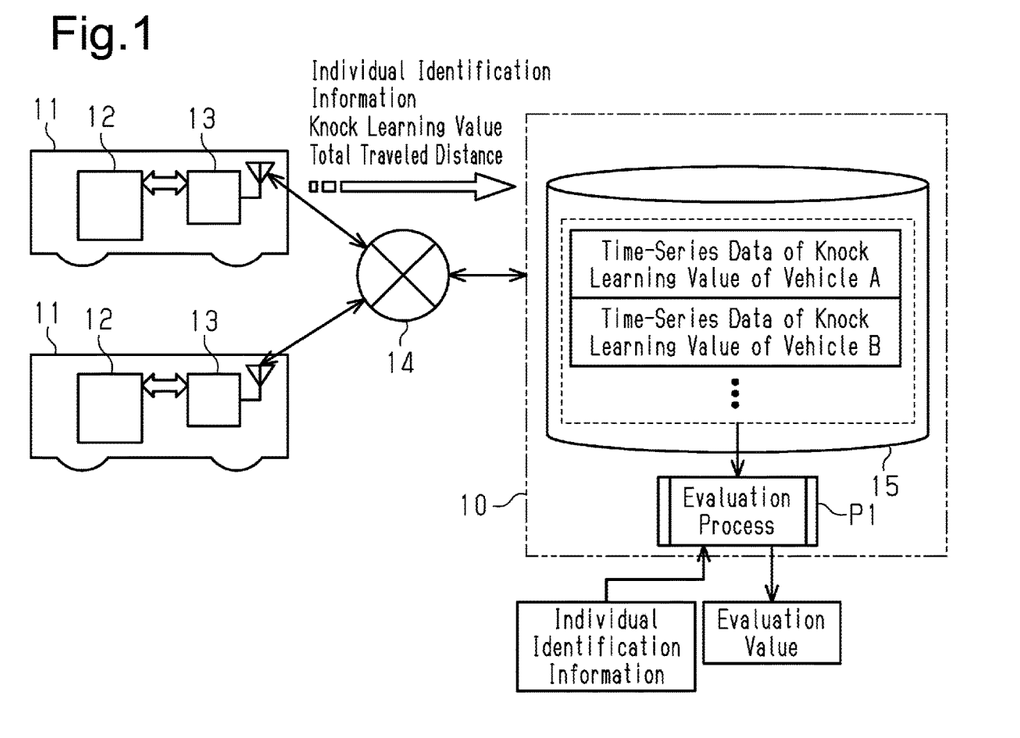
FIG. 1 is a schematic diagram illustrating the configuration of an engine diagnostic system according to a first embodiment of the present disclosure.

An engine diagnostic system 10 and an engine diagnosing method according to a first embodiment of the present disclosure will now be described with reference to FIGS. 1 to 3.

First, the configuration of the engine diagnostic system 10 according to the present embodiment will be described with reference to FIG. 1. The engine diagnostic system 10 is a computer system that manages a database 15. That is, the engine diagnostic system 10 is configured as a system that diagnoses the deterioration degree of an engine 12 mounted on each of vehicles 11 of the same model under management.

Each vehicle 11 under management of the engine diagnostic system 10 includes a control unit 13, which controls a variety of characteristics of the vehicle 11 including the engine 12. The control unit 13 includes a wireless transmission function and is capable of transmitting and receiving data to and from the engine diagnostic system 10 through a mobile communication network 14.

The control unit 13 of each vehicle 11 executes a knock control procedure in which the engine 12 is controlled to reduce knocking of the engine 12. In the knock control procedure, upon detection of the occurrence of knocking, the ignition timing is retarded. On the other hand, the knock control procedure gradually advances the ignition timing while knocking is not occurring to control the ignition timing to be advanced to the limit that reduces the occurrence of knocking. The knock control procedure learns, as a knock learning value, the advancement amount of the ignition timing up to the above-mentioned limit with respect to the base ignition timing, which is obtained from the engine rotational speed and the engine load factor.

The control unit 13 periodically transmits data to the engine diagnostic system 10. The data transmission includes transmitting the value of the current knock learning value, the individual identification information of the vehicle 11 such as a vehicle serial number, and the current total traveled distance of the vehicle 11 to the engine diagnostic system 10. In the present embodiment, the control unit 13 transmits data to the engine diagnostic system 10 as described above each time the learning of the knock learning value is completed.

The engine diagnostic system 10 includes the database 15. The database 15 stores the time-series data of the knock learning value of each vehicle 11 with the time-series data being associated with the individual identification information of the vehicle 11. Upon reception of the above-described data transmitted by the control unit 13 of each vehicle 11, the engine diagnostic system 10 adds the received knock learning value and the value of the total traveled distance to the end of the time-series data corresponding to the received individual identification information. As above, in the present embodiment, the database 15 collects the time-series data of the knock learning value of each vehicle 11 with the total traveled distance serving as the time-series axis.

Furthermore, the engine diagnostic system 10 executes an evaluation process P1 in response to a request for a deterioration diagnosis of the engine 12 from the outside. The request for a diagnosis is made by designating the individual identification information of the vehicle 11 to be diagnosed. In the evaluation process P1, in response to the input of the individual identification information designating the vehicle 11 on which the engine 12 to be diagnosed is mounted, the evaluation value indicating the deterioration degree of the engine 12 mounted on the vehicle 11 is computed. The computation value is then returned to the requestor of the diagnosis. In the following description, the vehicle 11 designated as the object to be diagnosed is referred to as the diagnosis subject vehicle.

When the engine 12 deteriorates over time, the knock resistance is decreased. This reduces the limit of the advancement amount of the ignition timing that reduces the occurrence of knocking. Thus, the knock learning value gradually becomes small. Consequently, the time-series data of the knock learning value indicates the progress of the deterioration of the engine 12.

Figure 2:
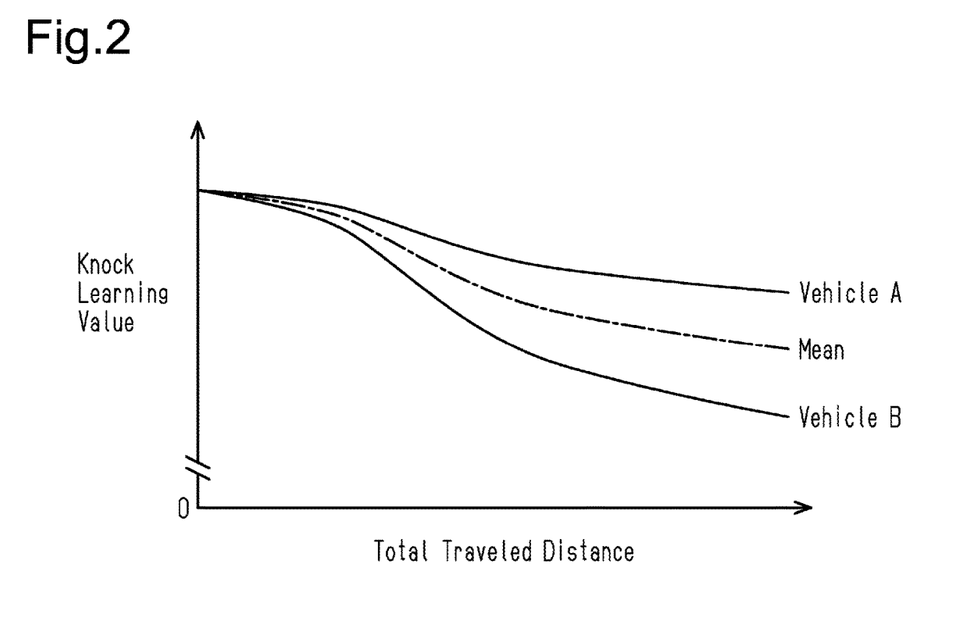
FIG. 2 is a graph showing the relationship between a knock learning value and a total traveled distance in the engine diagnostic system of FIG. 1.

FIG. 2 shows changes in the knock learning value of the engines 12 with respect to the total traveled distance for two vehicles A and B of the same model. Furthermore, FIG. 2 shows changes in the mean of the knock learning value with respect to the total traveled distance for all vehicles of the model same as the vehicles A and B with the alternate long and short dash line. The decrease in the knock learning value of the vehicle A with respect to the total traveled distance is smaller than the decrease in the mean of the knock learning value of all the vehicles of the same model. Furthermore, the decrease in the knock learning value of the vehicle B with respect to the total traveled distance is greater than the decrease in the mean of the knock learning values of all the vehicles of the same model. This shows that the progress of the deterioration of the engine 12 of the vehicle A is slower than the mean of all the vehicles of the same model, and the progress of the deterioration of the engine 12 of the vehicle B is faster than the mean of all the vehicles of the same model. In this manner, by comparing the sets of time-series data of the knock learning value collected in the database 15 with each other, the deterioration degree of the engine 12 is evaluated relative to all the vehicles of the same model.

The knock resistance varies among different engines 12 even if the engines 12 have not deteriorated at all immediately after the manufacture of the engines 12. The initial values of the knock learning values of the engines 12 of the vehicles 11 vary. The variation in the initial value is inherited to the value of the knock learning value when the deterioration of the engine 12 progresses. If the variation in the initial value is great, the change amount of the knock learning value from the initial value may be more appropriate for the index value of the deterioration degree of the engine 12 than the value of the knock learning value itself.

In the engine diagnostic system 10 of the present embodiment, the evaluation process P1 computes the following value as the evaluation value indicating the deterioration degree of the engine 12. That is, in the present embodiment, the rate of the change amount of the knock learning value with respect to the total traveled distance of each vehicle 11 is computed as the value of the knock learning value change rate from the time-series data of the knock learning value of each vehicle 11 collected in the database 15. The difference between the knock learning value change rate of the diagnosis subject vehicle and the mean of the knock learning value change rates of all the vehicles is computed as the evaluation value indicating the deterioration degree of the engine 12 of the diagnosis subject vehicle. The computed value of the difference indicates the deterioration degree of the engine 12 of the diagnosis subject vehicle as the evaluation relative to the vehicles of the same model.

Alternatively, the deviation value of the knock learning value change rate for the diagnosis subject vehicle among vehicles 11 may be computed as the evaluation value indicating the deterioration degree of the engine 12. Furthermore, the following value may be computed as the evaluation value indicating the deterioration degree of the engine 12. That is, first, the knock learning value when the total traveled distance reaches a predetermined distance or the change amount of the knock learning value until the total traveled distance reaches a predetermined distance is obtained for each vehicle 11. Subsequently, the difference between the mean of the obtained values and the value of the diagnosis subject vehicle or the deviation value of the value of the diagnosis subject vehicle among the obtained values of all the vehicles is computed as the evaluation value indicating the deterioration degree of the engine 12. Alternatively, instead of the difference or the deviation value itself, the grade of the deterioration degree determined using these values may be computed as the evaluation value indicating the deterioration degree of the engine 12. In any case, as long as the value represents the deterioration degree of the engine 12 of the diagnosis subject vehicle obtained from the time-series data of the knock learning value collected in the database 15 as the evaluation relative to the vehicles 11 of the same model, the value may be used as the evaluation value indicating the deterioration degree of the engine 12.

In the above-described present embodiment, the diagnosis of the deterioration degree of the engine 12 is performed through the following first step and second step. That is, the first step acquires and collects the time-series data of the knock learning value of the engine 12 from the vehicles 11 of the same model. In response to the input of the individual identification information of the engine 12 to be diagnosed, the second step computes the evaluation value indicating the deterioration degree of the engine 12 using the time-series data collected in the first step and outputs the evaluation value.

The engine diagnostic system 10 can be used in, for example, an information distribution service as follows. That is, the information distribution service provides the value information of a vehicle to the subjects for providing the information, which may be the participants of a used car auction, such as sellers, bidders, and appraisers. At the used car auction market, the information such as the model and the total traveled distance of the listed vehicle, smudges on the vehicle exterior, and damaged portions is provided to the bidder. The bidder determines the bidding price using the provided information. The condition of the engine is also an important factor in determining the vehicle value. However, under current circumstances, the bidder has no choice but to determine the condition of the engine indirectly from the total traveled distance. Therefore, currently, the value of a vehicle with the engine in a good condition despite its long total traveled distance cannot be evaluated properly. The above-described information distribution service provides the value information of the vehicle including the engine condition to the participants of the used car auction.

Figure 3:
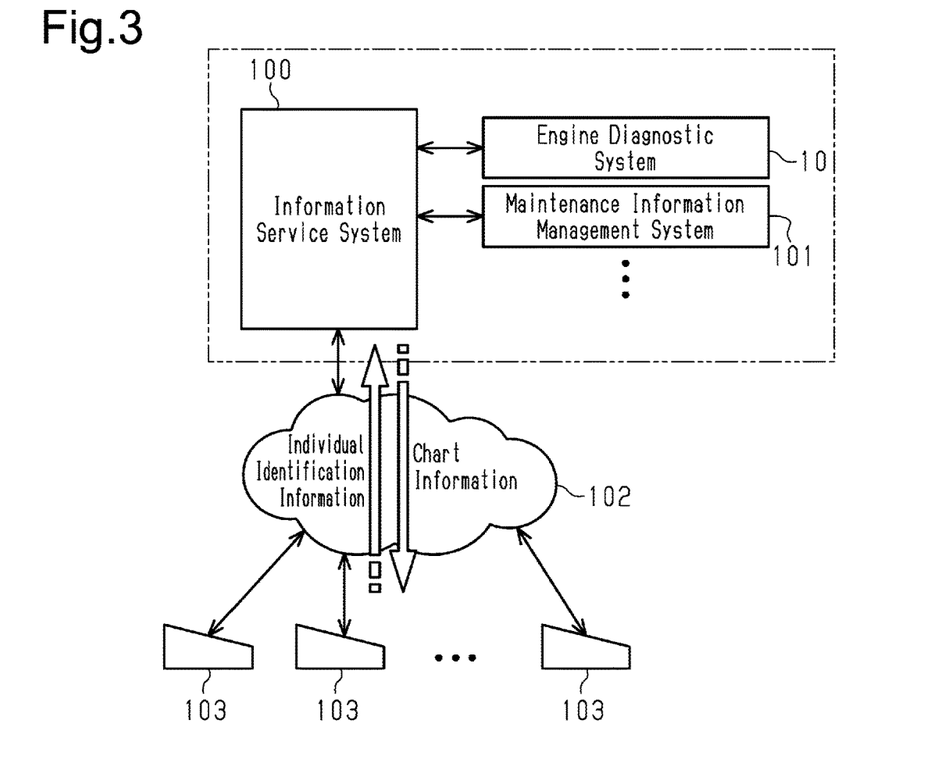
FIG. 3 is a schematic diagram illustrating the configuration of an information service system that provides information service in cooperation with the engine diagnostic system of the above-described embodiment in FIG. 1.

FIG. 3 shows the configuration of an information service system 100 for providing such information service. The information service system 100 is configured as a computer system that includes a Web server function. Various vehicle information management systems that manage the information of the vehicle are connected to the information service system 100. The engine diagnostic system 10 of the present embodiment is also one of the vehicle information management systems. The vehicle information management systems other than the engine diagnostic system 10 include, for example, a maintenance information management system 101, which manages the information of the maintenance history of each vehicle. The maintenance information management system 101 stores the information on the maintenance history of each vehicle with the information being associated with the individual identification information. The information service system 100 is connected to computer terminals 103, which are operated by the participants of the used car auction, through an Internet connection 102.

Each participant of the used car auction transmits the individual identification information of a listed vehicle to the information service system 100 through one of the computer terminals 103. The information service system 100 acquires the information of the corresponding vehicle from the vehicle information management systems in accordance with the received individual identification information. The information service system 100 acquires the evaluation value indicating the deterioration degree of the engine 12 of the corresponding vehicle from the engine diagnostic system 10. The information service system 100 subsequently makes a vehicle chart using the acquired information and transmits the vehicle chart to the computer terminal 103 from which the individual identification information was sent. The vehicle chart includes various kinds of information on the vehicle usable for determining the bidding price. The information includes, for example, the driving tendency of the former driver of the vehicle, the evaluation of the engine, the evaluation of the driving battery, the maintenance state, the history of failures, the history of accidents, and whether it is a one-owner vehicle. The evaluation value indicating the deterioration degree of the engine 12 acquired from the engine diagnostic system 10 is also used for making the vehicle chart.

The engine diagnostic system and the engine diagnosing method of the present embodiment have the following advantages.

(1) The sets of time-series data of the knock learning value of the vehicles 11 of the same model are collected, and the evaluation value indicating the deterioration degree of the engine 12 is computed using the sets of collected time-series data. Thus, the deterioration degree of the engine 12 of the diagnosis subject vehicle is evaluated as the evaluation relative to the vehicles of the same model.

(2) The deterioration degree of the engine 12 of the diagnosis subject vehicle is evaluated as the evaluation relative to the vehicles of the same model. Thus, the diagnosis can be properly performed without previously setting the criterion of the knock learning value used in evaluating the deterioration degree of the engine 12.

(3) There are individual differences in the initial value of the knock learning value among the engines 12. The individual differences are inherited to the values of the knock learning value when the deterioration of the engines 12 progresses. Thus, for example, if the evaluation value indicating the deterioration degree of each engine 12 is computed using the value of the knock learning value itself, an error may possibly occur due to the individual differences among the engines 12. In this respect, in the above-described embodiment, the evaluation value indicating the deterioration degree is computed using the change amount of the knock learning value from the initial value. Thus, the individual differences in the initial value of the knock learning value among the engines 12 unlikely influence the computation result of the evaluation value indicating the deterioration degree of the associated engine 12.

Second Embodiment

An engine diagnostic system 20 and an engine diagnosing method according to a second embodiment of the present disclosure will now be described in detail with reference to FIG. 4. In the present embodiment, like or the same reference numerals are given to those components that are like or the same as the corresponding components of the first embodiment, and the detailed description will be omitted.

Figure 4:
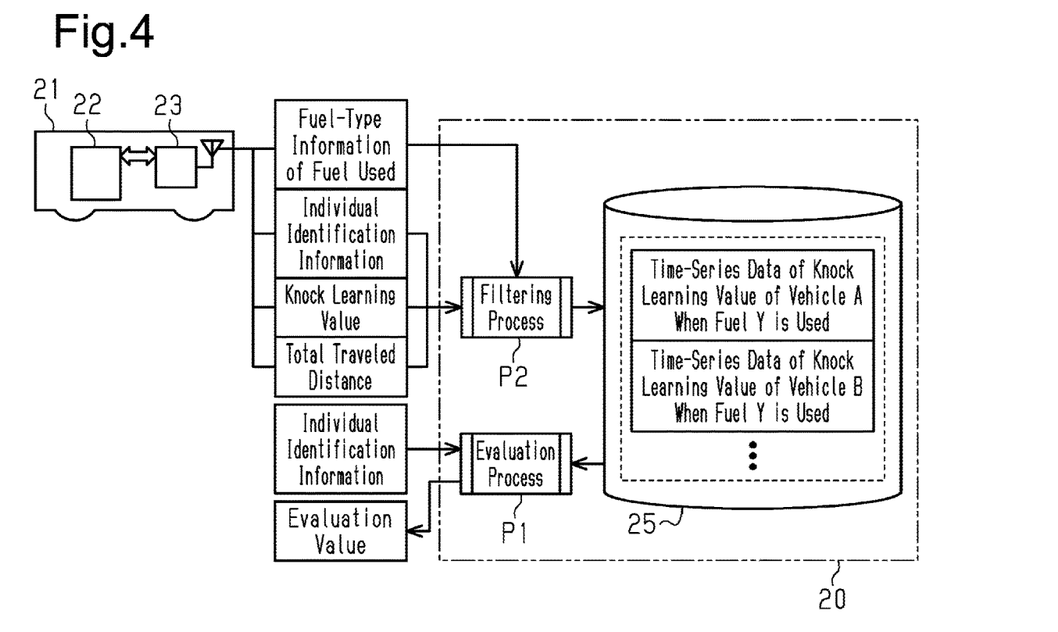
FIG. 4 is a schematic diagram illustrating the configuration of an engine diagnostic system according to a second embodiment of the present disclosure.

Like the first embodiment, the engine diagnostic system 20 of the present embodiment shown in FIG. 4 is configured as a computer system that manages a database 25. Like the case in the first embodiment, the engine diagnostic system 20 of the present embodiment also executes the evaluation process P1, which computes the evaluation value indicating the deterioration degree of the engine using the time-series data of the knock learning value collected in the database 25.

An engine 22 of a vehicle 21 under management of the engine diagnostic system 20 of the present embodiment is configured to be capable of using two types of fuel, or fuel X and fuel Y, which has a lower knock resistance than the fuel X. The engine 22 is designed to exhibit higher output performance when the fuel X, which has a higher knock resistance, is used than when the fuel Y is used. Furthermore, the vehicle 21 includes a control unit 23, which has a wireless transmission function. The control unit 23 executes a knock control procedure for controlling knocking of the engine 22. In controlling knocking of the engine 22 of the vehicle 21, the advancement amount of the ignition timing is reduced when the fuel Y, which has a lower knock resistance, is used compared with the case when the fuel X is used. Thus, the knock learning value also takes a smaller value when the fuel Y is used compared with the case when the fuel X is used.

Additionally, the control unit 23 of the vehicle 21 executes a fuel determination process for determining the type of fuel used in the engine 22. The fuel determination process is executed in the following manner, for example. When the fuel used in the engine 22 is switched from the fuel Y to the fuel X, which has a higher knock resistance than the fuel Y, the ignition timing advancement amount in the knock control procedure is significantly increased. Conversely, if the fuel used in the engine 22 is changed from the fuel X to the fuel Y, which has a lower knock resistance than the fuel X, the ignition timing advancement amount in the knock control procedure is significantly reduced. In the fuel determination process, the type of fuel being used in the engine 22 is determined from the changes in the advancement amount of the ignition timing in the knock control procedure before and after the detection of fueling through the increase in the remaining amount of fuel in the fuel tank while the vehicle is stopped or the opening and closing of an oil filler cap.

Furthermore, the control unit 23 of the vehicle 21 transmits the fuel-type information of the fuel used that is determined in the fuel determination process to the engine diagnostic system 20 in addition to the individual identification information, the value of the current knock learning value, and the value of the current total traveled distance. Upon reception of the data from the vehicle 21, the engine diagnostic system 20 executes a filtering process P2 using the received fuel-type information. In the filtering process P2, only when the fuel used in the engine 22 indicated by the fuel-type information is the fuel Y, the received knock learning value and the value of the total traveled distance are added to the end of the time-series data corresponding to the received individual identification information. That is, if the fuel used in the engine 22 indicated by the fuel-type information is the fuel X, the engine diagnostic system 20 does not add the received knock learning value and the value of the total traveled distance to the time-series data. The database 25 of the engine diagnostic system 20 according to the present embodiment stores the time-series data of the knock learning value learned when the engine 22 of each vehicle 21 is using the fuel Y.

As described above, the knock learning value of the engine 22 changes significantly between the case when the fuel X is used and the case when the fuel Y is used. If the knock learning value when the fuel X is used and the knock learning value when the fuel Y is used are mixed in the time-series data, the changes in the knock learning value caused by the influence of the deterioration are unlikely to show in the time-series data. That is, the deterioration degree of the engine 22 may possibly fail to be diagnosed properly. In contrast, in the engine diagnostic system 20 of the present embodiment, only the time-series data of the knock learning value learned when the fuel Y is used in the engine 22 is collected in the database 25 through the filtering process P2 using the fuel-type information of the fuel used that is transmitted from the vehicle 21. Thus, the deterioration degree of the engine 22 that uses two types of fuel having different knock resistances from each other is properly diagnosed.

Third Embodiment

An engine diagnostic system 30 and an engine diagnosing method according to a third embodiment of the present disclosure will now be described in detail with reference to FIGS. 5 and 6. In the present embodiment, like or the same reference numerals are given to those components that are like or the same as the corresponding components of the above-described embodiments, and the detailed description will be omitted.

Figure 5:
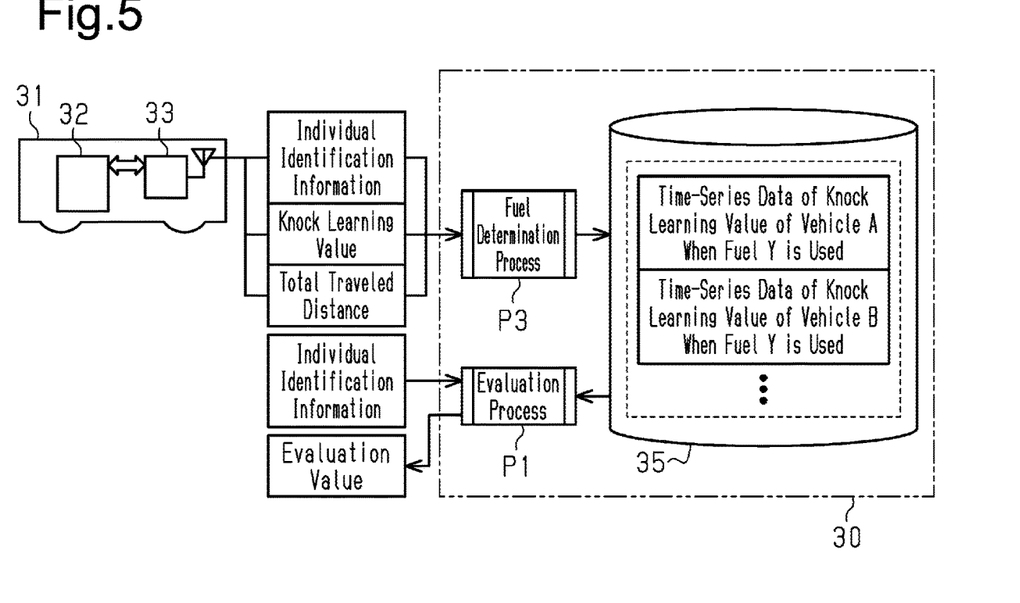
FIG. 5 is a schematic diagram illustrating the configuration of an engine diagnostic system according to a third embodiment of the present disclosure.

Like each of the above embodiments, the engine diagnostic system 30 of the present embodiment shown in FIG. 5 is configured as a computer system that manages a database 35. The engine diagnostic system 30 of the present embodiment also executes the evaluation process P1, which is the same as the cases in the above embodiments. That is, the evaluation process P1 computes the evaluation value indicating the deterioration degree of the engine using the time-series data of the knock learning value collected in the database 35.

Additionally, an engine 32 of a vehicle 31 under management of the engine diagnostic system 30 of the present embodiment is configured to be capable of using two types of fuel, or the fuel X and the fuel Y, as in the second embodiment. Furthermore, the vehicle 31 includes a control unit 33, which has a wireless transmission function. The control unit 33 executes a knock control procedure for controlling knocking of the engine 32. However, in the present embodiment, when transmitting data to the engine diagnostic system 30, the control unit 33 transmits only the individual identification information, the value of the current knock learning value, and the value of the current total traveled distance. In the present embodiment, the engine diagnostic system 30 executes a fuel determination process P3. The fuel determination process P3 determines the type of fuel used in the engine 32 when the knock learning value received from the vehicle 31 is learned. Only when it is determined in the fuel determination process P3 that the fuel used when the received knock learning value is learned is the fuel Y, the engine diagnostic system 30 adds the received knock learning value and the value of the total traveled distance to the time-series data of the knock learning value of the corresponding vehicle. That is, if it is determined in the fuel determination process P3 that the fuel used when the received knock learning value is learned is the fuel X, the engine diagnostic system 30 does not add the received knock learning value and the value of the total traveled distance to the time-series data of the knock learning value of the corresponding vehicle. The database 35 of the engine diagnostic system 30 of the present embodiment stores the time-series data of the knock learning value learned when the engine 32 of each vehicle 31 is using the fuel Y.

Figure 6:
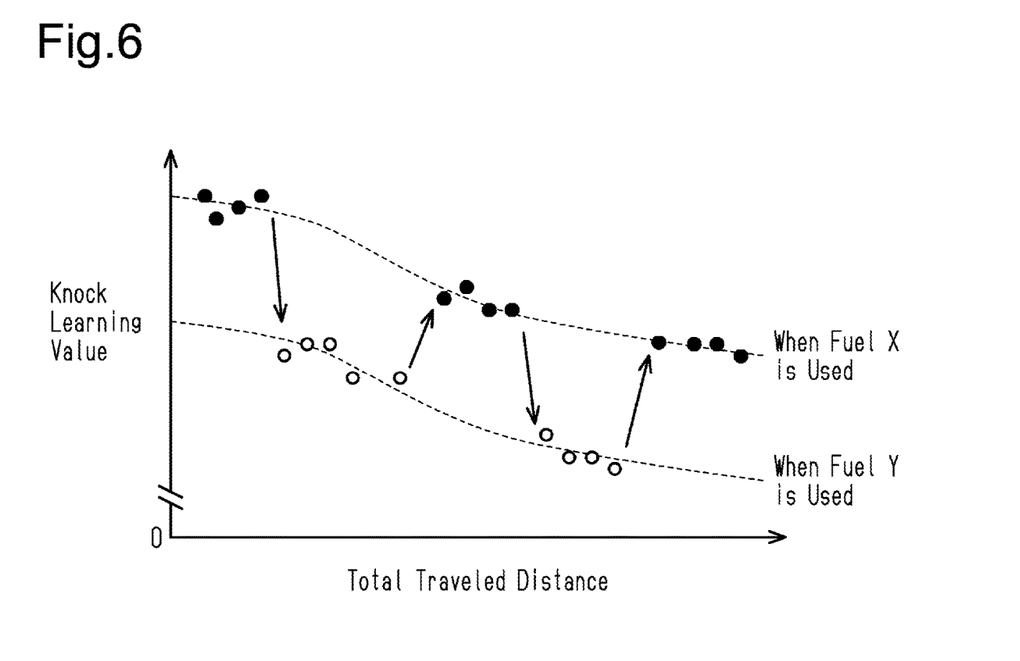
FIG. 6 is a graph showing the changes in the knock learning value and the total traveled distance transmitted from the vehicle to the engine diagnostic system when the fuel used is periodically switched between fuel X and fuel Y in the engine diagnostic system of FIG. 5.

FIG. 6 shows the changes in the knock learning value and the value of the total traveled distance transmitted from the vehicle 31 to the engine diagnostic system 30 when the fuel used in the engine 32 is periodically switched between the fuel X and the fuel Y. In FIG. 6, the value when the fuel X is used is shown by a solid circle (black circle), and the value when the fuel Y is used is shown by a hollow circle (white circle). As described above, in the present embodiment, the engine diagnostic system 30 stores in the database 35 only the time-series data of the knock learning value learned when the fuel Y is used in the engine 32. When the fuel used in the engine 32 is switched from the fuel Y to the fuel X, the knock learning value is significantly increased. Thus, through comparison with the value of the knock learning value stored at the end of the time-series data, if the value of the knock learning value received from the vehicle 31 is greater than the maximum value in the variation range of the knock learning value that is supposed to be obtained when the fuel Y continues to be used, the engine diagnostic system 30 can determine that the fuel X is used when the received knock learning value is learned. In the fuel determination process P3, the type of fuel used is determined by the comparison between the value stored at the end of the time-series data and the value received by the engine diagnostic system 30 as described above. That is, in the fuel determination process P3, the type of fuel used in the engine 32 is determined from the difference between the previously acquired value and the currently acquired value of the knock learning value of the engine 32 to be determined.

In the engine diagnostic system 30 of the present embodiment also, only the time-series data of the knock learning value learned when the fuel Y is used is collected in the database 35 through the fuel determination process P3. Consequently, the deterioration degree of the engine 32, which uses two types of fuel that have different knock resistances from each other, is properly diagnosed.

Fourth Embodiment

An engine diagnostic system 40 and an engine diagnosing method according to a fourth embodiment of the present disclosure will now be described in detail with reference to FIG. 7. In the present embodiment, like or the same reference numerals are given to those components that are like or the same as the corresponding components of the above-described embodiments, and the detailed description will be omitted.

Figure 7:
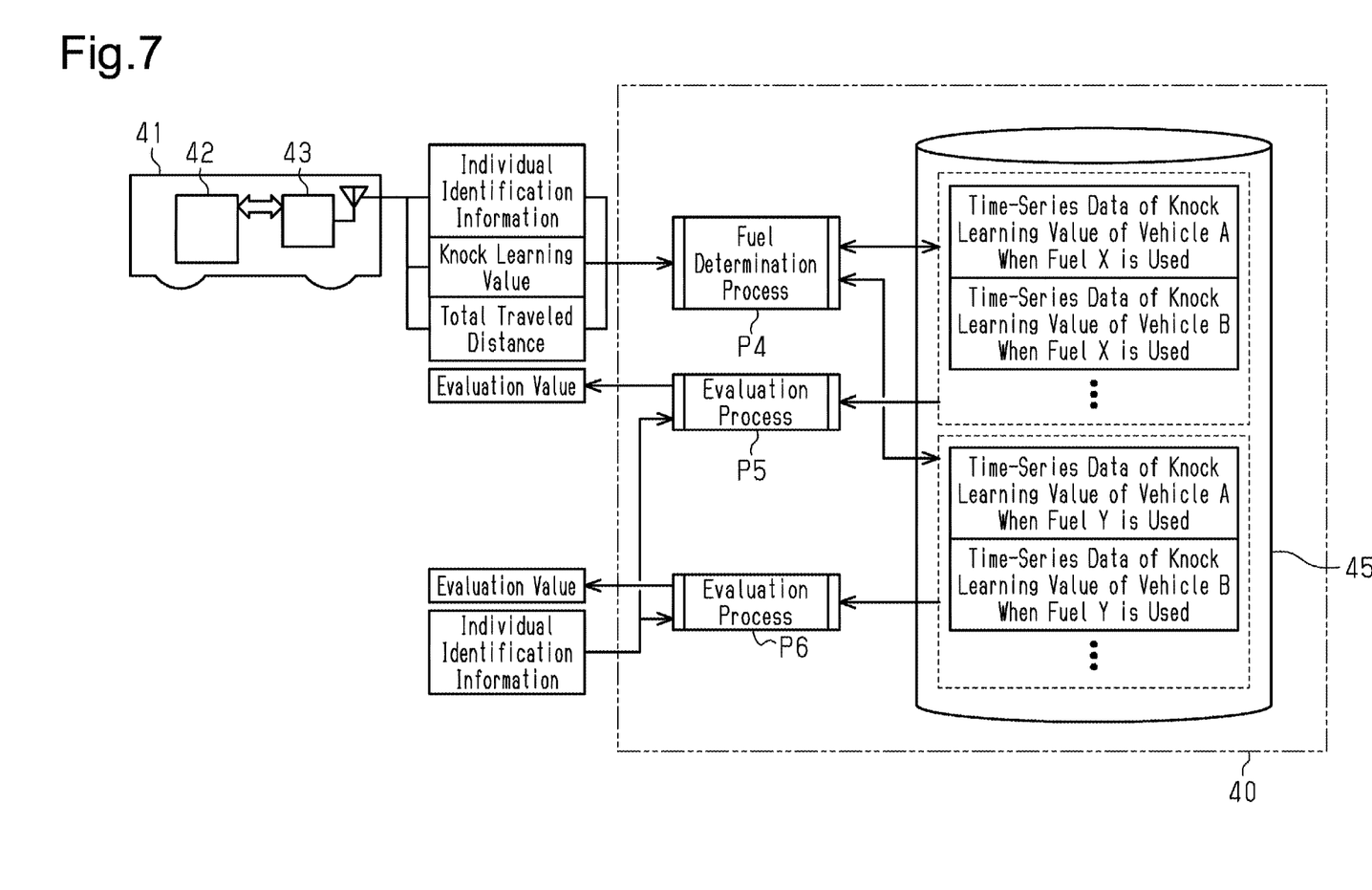
FIG. 7 is a schematic diagram illustrating the configuration of an engine diagnostic system according to a fourth embodiment of the present disclosure.

Like each of the above embodiments, the engine diagnostic system 40 of the present embodiment shown in FIG. 7 is configured as a computer system that manages a database 45. Additionally, an engine 42 of a vehicle 41 under management of the engine diagnostic system 40 of the present embodiment is configured to be capable of using two types of fuel, or the fuel X and the fuel Y, as in the second embodiment and the third embodiment. Furthermore, the vehicle 41 includes a control unit 43, which has a wireless transmission function. The control unit 43 executes a knock control procedure for controlling knocking of the engine 42. Like in the case of the third embodiment, the control unit 43 transmits only the individual identification information, the value of the current knock learning value, and the value of the current total traveled distance to the engine diagnostic system 40.

Like the third embodiment, the engine diagnostic system 40 of the present embodiment executes a fuel determination process P4. The database 45 of the engine diagnostic system 40 of the present embodiment stores the time-series data of the knock learning value learned when the fuel X is used in each vehicle 41 and the time-series data of the knock learning value learned when the fuel Y is used in each vehicle 41 separately for each vehicle. The engine diagnostic system 40 selects the time-series data to which the received knock learning value and the value of the total traveled distance will be added on the basis of the determination result of the fuel determination process P4.

Furthermore, the engine diagnostic system 40 of the present embodiment executes an evaluation process P5 and an evaluation process P6 in response to a request for a diagnosis of the engine 42 from the outside. In the evaluation process P5, the evaluation value indicating the deterioration degree of the engine 42 of the diagnosis subject vehicle is computed using the time-series data of the knock learning value obtained when the fuel X is used in each vehicle 41 and collected in the database 45. In contrast, in the evaluation process P6, the evaluation value indicating the deterioration degree of the engine 42 of the diagnosis subject vehicle is computed using the time-series data of the knock learning value obtained when the fuel Y is used in each vehicle 41 and collected in the database 45. The engine diagnostic system 40 returns the two evaluation values computed separately in the evaluation process P5 and the evaluation process P6 to the requestor of the diagnosis.

The engine diagnostic system 40 of the present embodiment stores the time-series data of the knock learning value in the database 45 and computes the evaluation value through the evaluation processes P5 and P6 separately for each type of fuel. Thus, in the present embodiment also, the deterioration degree of the engine 42 that uses two types of fuel having different knock resistances from each other is properly diagnosed.

The above-described embodiments may be modified as follows. The above-described embodiments and the following modifications can be combined as long as the combined modifications remain technically consistent with each other.

The filtering process P2 executed by the engine diagnostic system 20 of the second embodiment may be executed in the vehicle 21. That is, the individual identification information, the knock learning value, and the total traveled distance are transmitted from the vehicle 21 to the engine diagnostic system 20 only when the control unit 23 of the vehicle 21 determines that the fuel Y is being used in the vehicle 21 in the fuel determination process. In this case, the transmission of the fuel-type information of the fuel used to the engine diagnostic system 20 may be omitted.

In the second embodiment and the third embodiment, only the time-series data of the knock learning value when the fuel Y is used in each vehicle 21, 31 is stored in the database 25, 35. Instead, only the time-series data of the knock learning value when the fuel X is used in each vehicle 21, 31 may be stored in the database 25, 35.

The engine diagnostic system 20, 30, 40 of the second to fourth embodiments may be configured as a system for diagnosing the deterioration of the engine that uses three or more types of fuel. In this case also, only the time-series data of the knock learning value learned when the specific type of fuel is being used is stored in the database. Alternatively, the storage of the time-series data of the knock learning value of each vehicle and the computation of the evaluation value through the evaluation process are performed separately for each type of fuel. In this manner, the deterioration degree of the engine that uses three or more types of fuel is properly diagnosed.

In each of the above-described embodiments, the data transmission of, for example, the knock learning value from the vehicle to the engine diagnostic system is performed each time the learning of the knock learning value is completed. However, the data transmission may be performed at other points in time. For example, the data transmission may be performed each time a certain period of time elapses, or the data transmission may be performed each time the vehicle travels a certain distance. Alternatively, the engine diagnostic system may determine the time at which the data is transmitted. In this case, the data transmission from the vehicle is performed in response to the request from the engine diagnostic system.

A parameter other than the total traveled distance, such as the total operation time of the engine or the number of days from the beginning of use, may be used as the time-series axis of the time-series data of the knock learning value to be stored in the database.

In each of the above-described embodiments, the maximum advancement amount of the ignition timing that reduces knocking is learned as the knock learning value. In many of the vehicle engines, the minimum retardation amount of the ignition timing that reduces knocking is learned as the learning value. The minimum retardation amount is the retardation amount of the ignition timing from the advancement limit of the ignition timing determined in accordance with the operating condition of the engine to the knock control ignition timing. As used herein, the knock control ignition timing refers to the ignition timing advanced to the limit that reduces knocking through the knock control procedure. The minimum retardation amount of the ignition timing represents substantially the same state quantity as the maximum advancement amount of the ignition timing that reduces knocking described in each of the above embodiments. Thus, the learning value of the minimum retardation amount may be used as the knock learning value of each of the above-described embodiments. Note that, the learning value of the minimum retardation amount changes to increase in accordance with the decrease in the knock resistance of the engine due to deterioration over time.

The engine diagnostic system of each of the above-described embodiments may be used for other applications besides the vehicle information service to participants of the used car auction. For example, the engine diagnostic system of each of the above-described embodiments may be used for information service that provides the maintenance agency of the vehicle with the evaluation value indicating the deterioration degree obtained by the engine diagnostic system 10 as the criterion for determining the time for the maintenance of the engine and the replacement of parts.

The engine diagnostic system is not limited to a device that includes a CPU and a ROM and executes software processing. For example, at least part of the processes executed by the software in the above-illustrated embodiment may be executed by hardware circuits dedicated to executing these processes (such as ASIC). That is, the engine diagnostic system may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing devices each including a processor and a program storage device and a plurality of dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine diagnostic system that diagnoses a deterioration degree of an engine, the engine being mounted on a vehicle, wherein
    the engine diagnostic system is configured to learn, as a knock learning value, a maximum advancement amount of an ignition timing that reduces knocking of the engine,
    the engine diagnostic system comprises a database, which is configured to store time-series data of the knock learning value of the engine for each individual engine, the knock learning value being acquired from each of a plurality of vehicles of the same model, and
    the engine diagnostic system is configured to execute an evaluation process, which computes an evaluation value indicating the deterioration degree of a designated engine using the time-series data of the knock learning value of each engine stored in the database.

2. The engine diagnostic system according to claim 1, wherein
    the engine diagnostic system is configured to acquire, from the vehicle, fuel-type information of fuel used in the engine when the knock learning value is learned together with the knock learning value, and
    the engine diagnostic system is configured to store, in the database, only the time-series data of the knock learning value learned when a specific type of fuel is being used.

3. The engine diagnostic system according to claim 1, wherein
    the engine diagnostic system is configured to execute a fuel determination process, which determines a type of fuel used in the engine when the knock learning value is learned, and
    the engine diagnostic system is configured to store, in the database, only the time-series data of the knock learning value learned when a specific type of fuel is being used.

4. The engine diagnostic system according to claim 3, wherein the fuel determination process is executed by determining the type of fuel used based on the difference between a previously acquired value and a currently acquired value of the knock learning value of the engine to be determined.

5. The engine diagnostic system according to claim 1, wherein
    the engine diagnostic system is configured to execute a fuel determination process, which determines a type of fuel used in the engine when the knock learning value is learned, and
    the engine diagnostic system is configured to store the time-series data of the knock learning value in the database and to compute the evaluation value in the evaluation process separately for each type of fuel.

6. The engine diagnostic system according to claim 1, wherein the database stores the time-series data of the knock learning value with a total traveled distance of the vehicle used as a time-series axis.

7. An engine diagnosing method for diagnosing a deterioration degree of an engine mounted on a vehicle, the engine diagnosing method comprising:
    learning, as a knock learning value, a maximum advancement amount of an ignition timing that reduces knocking of the engine;

acquiring and collecting time-series data of the knock learning value of the engine from a plurality of vehicles of the same model; and computing and outputting an evaluation value indicating the deterioration degree of the engine to be diagnosed using the collected time-series data in response to an input of individual identification information of the engine to be diagnosed, wherein the engine diagnosing method diagnoses the deterioration degree of the engine through the acquiring and collecting of the time-series data and the computing and outputting of the evaluation value.

8. A non-transitory computer-readable recording medium storing a program for causing a processor to execute an engine diagnosing process for diagnosing a deterioration degree of an engine mounted on a vehicle, the engine diagnosing process including learning, as a knock learning value, a maximum advancement amount of an ignition timing that reduces knocking of the engine;

acquiring and collecting time-series data of the knock learning value of the engine from a plurality of vehicles of the same model; and computing and outputting an evaluation value indicating the deterioration degree of the engine to be diagnosed using the collected time-series data in response to an input of individual identification information of the engine to be diagnosed, wherein the engine diagnosing process diagnoses the deterioration degree of the engine through the acquiring and collecting of the time-series data and the computing and outputting of the evaluation value.

* * * * *